United States Patent [19]
Choi et al.

[11] Patent Number: 5,233,645
[45] Date of Patent: Aug. 3, 1993

[54] AUTOMATIC POWER BREAKING CIRCUITS FOR COMMUNICATION EQUIPMENTS

[75] Inventors: Gak J. Choi; Ho Y. Kim; Young I. Kim; Kyung H. No; Ki H. Kim, all of Daejeon, Rep. of Korea

[73] Assignees: Electronics and Telecommunications Research Institute; Korea Telecommunication Authority, Rep. of Korea

[21] Appl. No.: 780,365

[22] Filed: Oct. 22, 1991

[30] Foreign Application Priority Data

Oct. 25, 1990 [KR] Rep. of Korea ............... 1990-17174

[51] Int. Cl.$^5$ ..................... H04M 11/00; H04B 1/16
[52] U.S. Cl. ..................................... 379/61; 455/343
[58] Field of Search ................... 379/56, 58, 61, 62; 455/54.1, 91, 127, 38.1, 343, 35, 78, 38.3, 127, 31.1

[56] References Cited

U.S. PATENT DOCUMENTS

| | | | |
|---|---|---|---|
| 4,086,429 | 4/1978 | Kotezawa et al. | 455/31.1 |
| 4,731,814 | 3/1988 | Becker et al. | 379/62 |
| 5,031,231 | 7/1991 | Miyazaki | 455/54.1 |
| 5,142,563 | 8/1992 | Nyuu et al. | 379/61 |

Primary Examiner—Curtis Kuntz
Assistant Examiner—William D. Cumming
Attorney, Agent, or Firm—Blakely, Sokoloff, Taylor & Zafman

[57] ABSTRACT

An automatic power breaking circuit for a communication equipment, for breaking automatically electric power in the communication equipment when the communication equipment does not perform transmission and reception for talk. The present circuit comprises a call processing tone detector 1 connected to a receiving stage of the communication equipment, for detecting a plurality of predetermined tones provided from a switch board of an exchange, a JK flip-flop 2 connected to said call processing tone detector 1, for receiving a source voltage, a talk terminal 4 for receiving said source voltage and being manually switched to an ON state by the user when transmission or reception is required, a D flip-flop 6 connected to said talk terminal 4, an AND gate 7 connected to output terminals of said JK flip-flop 2 and D flip-flop 6, and a transistor 8 connected to an output terminal of said AND gate 7w for switching power being supplied to a transmitting stage of the communication equipment. In accordance with the present invention, an unnecessary loss of the electric power in the communication equipment can be prevented, so that the life span of a charging battery contained therein and the portable communication period of time can be lengthened, and the power supply can be miniaturized.

9 Claims, 3 Drawing Sheets

AUTOMATIC POWER BREAKING CIRCUITS FOR COMMUNICATION EQUIPMENTS

BACKGROUND OF THE INVENTION

1. Field of the Invention

The present invention relates in general to automatic power breaking circuits, and more particularly to automatic power breaking circuits for preventing an unnecessary loss of electric power in portable communication equipments in which the power is of very interest.

2. Description of the Prior Art

In conventional portable communication equipments such as, for example, a handset of a cordless phone, a portable telephone and the like, electric power has been of very interest, in that power supplies for supplying the power possessed considerable portions of the overall constructions of the equipments in terms of weight and volume. It has therefore been required to allow the power supplies to be used for a long time with making the sizes of the power supplies small as far as possible.

The conventional portable communication equipments have utilized charging batteries contained therein, wherein the portable communication period of time was determined in accordance with the charged power and consumption power. Until now, however, in the conventional portable communication equipments, the utilization has been inconvenient in that the user should select one of Talk/Standby/Off modes by hand. Also, it has sometimes happened that the user did not break the power through his carelessness after completing the talk, resulting in an unnecessary loss of the electric power in the portable communication equipments. In result, the portable communication period of time was shortened.

SUMMARY OF THE INVENTION

Therefore, the present invention has been made in view of the above problems, and it is an object of the present invention to provide an automatic power breaking circuit for breaking automatically electric power in a portable communication equipment when the portable communication equipment does not perform transmission and reception for talk, so that the life span of a charging battery and the portable communication period of time can be lengthened.

In accordance with the present invention, the object can be accomplished by providing an automatic power breaking circuit for a communication equipment, for breaking automatically electric power in the communication equipment when the communication equipment does not perform transmission and reception for talk, comprising: call processing tone detecting means connected to a receiving stage of the communication equipment, for detecting a plurality of predetermined tones provided from a switch board of an exchange; first flip-flop means connected to said call processing tone detecting means, for receiving a source voltage; talk terminal means for receiving said source voltage and being manually switched to an ON state by the user when transmission or reception is required; second flip-flop means connected to said talk terminal means; ANDing means connected to output terminals of said first and second flip-flop means; and switching means connected to an output terminal of said ANDing means, for switching power being supplied to a transmitting stage of the communication equipment; whereby the power can automatically be broken by detecting said plurality of predetermined tones.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF PREFERRED EMBODIMENTS

Figure 1:
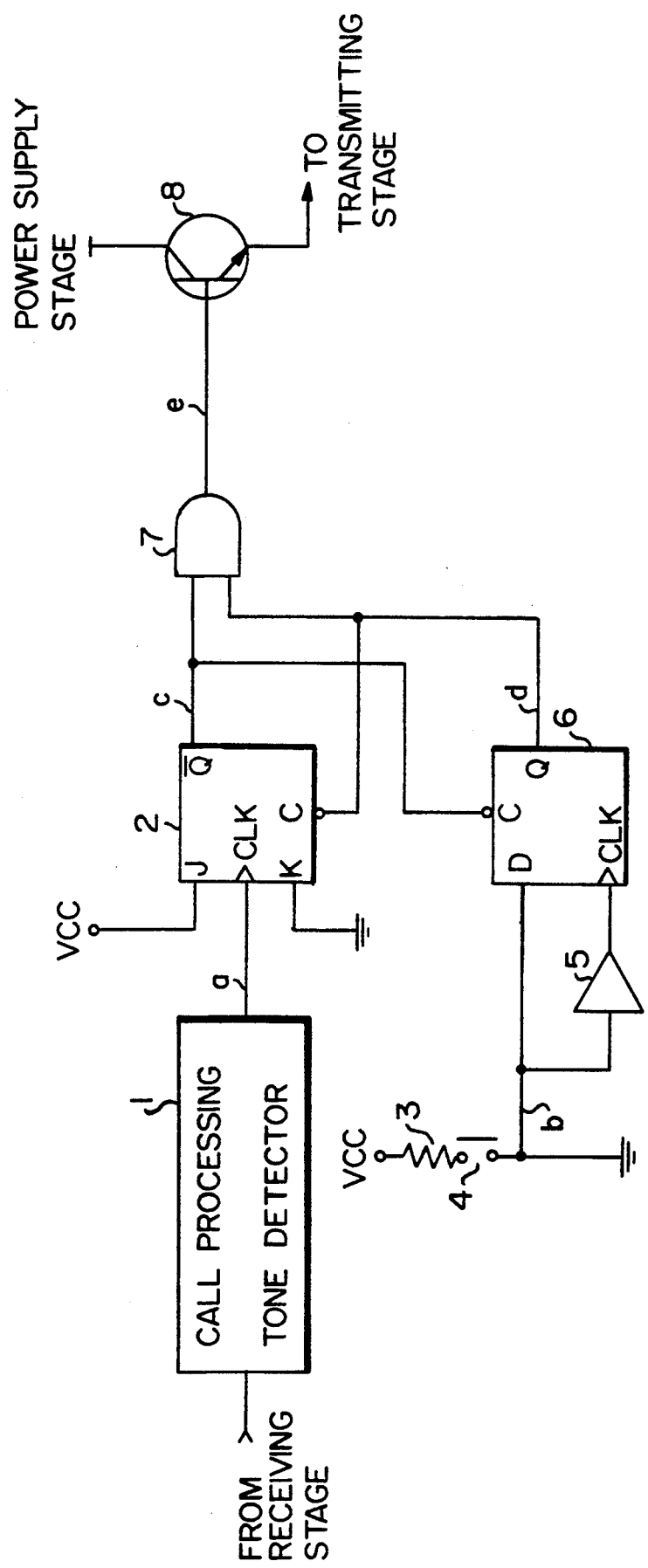
FIG. 1 is a detailed circuit diagram of an embodiment of an automatic power breaking circuit of the present invention.

With reference to FIG. 1, there is shown a detailed circuit diagram of an embodiment of an automatic power breaking circuit of the present invention. In this drawing, the reference numeral 1 designates a call processing tone detector, 2 a JK flip-flop, 3 a resistor, 4 a talk terminal, 5 a buffer, 6 a D flip-flop, 7 an AND gate, and 8 a npn transistor, respectively.

As shown in the drawing, the automatic power breaking circuit of the present invention comprises a call processing tone detector 1 connected to a receiving stage of a portable communication equipment, for detecting dual tones such as a busy toNe, an alarm tone and etc., provided from a switch board of an exchange which manages a public service telecommunication network (PSTN) as a whole.

The automatic power breaking circuit of the present invention also comprises a talk terminal 4 for receiving a source voltage Vcc through a resistor 3 and being manually switched to an ON state when the user is either to do reception due to the generation of a ring tone or to do transmission under a non-talk condition.

Also, the automatic power breaking circuit comprises a buffer 5 connected to the talk terminal 4 for delay of a signal, a JK flip-flop 2 including its J input terminal for receiving the source voltage Vcc, its clock input terminal Clk connected to the call processing tone detector 1 and its K input terminal connected to ground, a D flip-flop 6 including its D input terminal connected to the talk terminal 4 and its clock input terminal Clk connected to the buffer 5, a two-input AND gate 7 including its one input terminal connected to a negative output terminal $\overline{Q}$ of the JK flip-flop 2 and its other input terminal connected to a positive output terminal Q of the D flip-flop 6, and a npn transistor 8 including its collector connected to a power supply stage of the portable communication equipment, its base connected to an output terminal of the AND gate 7 and its emitter connected to a transmitting stage of the portable communication equipment.

The JK flip-flop 2 also includes its clear terminal C connected to the positive output terminal Q of the D flip-flop 6. The D flip-flop 6 also includes its clear terminal C connected to the negative output terminal $\overline{Q}$ of the JK flip-flop 2. The talk terminal 4 is provided with a toggle switch.

Now, the operation of the automatic power breaking circuit with the above-mentioned construction in accordance with the present invention will be described in detail with reference to FIG. 3.

Figure 3:
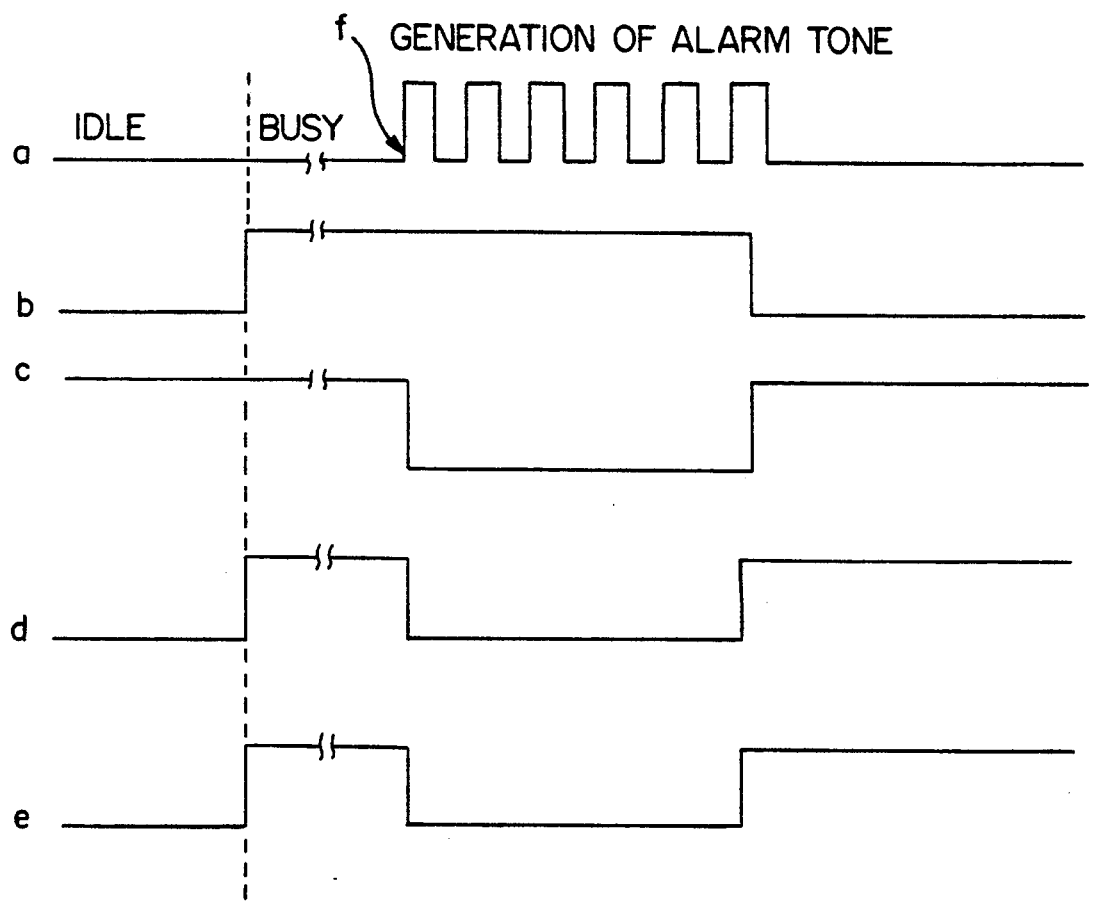
FIG. 3 is a timing diagram of signals from respective components in FIG. 1.

With reference to FIG. 3, there are shown a timing diagram of signals from respective components in FIG. 1. Under the non-talk and talk conditions, a low signal appears at the output from the call processing tone detector 1, as indicated as the reference numeral a in FIG. 3. Upon detecting dual tones such as a busy tone, a leave-alone tone, an alarm tone and etc., sent from the communication network (the switch board of the exchange), the call processing tone detector 1 outputs a high signal as shown as the reference numeral a in FIG. 3. Under the talk condition, contacts of the talk terminal 4 provided with the toggle switch are switched to an ON state so that the talk terminal 4 applies a high signal to the data input terminal D of the D flip-flop 6, while, under the non-talk condition, the contacts of the talk terminal 4 are switched to an OFF state so that the talk terminal 4 applies a low signal to the data input terminal D of the D flip-flop 6, as indicated as the reference numeral b in FIG. 3. For the purpose of a more efficient discussion of the operation of the automatic power breaking circuit in accordance with the present invention, the operation will be mentioned individually in accordance with respective conditions, non-talk, talk and alarm tone detection.

First, the operation of the automatic power breaking circuit will be described according to the non-talk condition. This non-talk condition means a standby condition that the power of the portable communication equipment is turned on and the talk terminal 4 is turned off. Under this non-talk condition, a low signal is applied to the clock terminal clk of the JK flip-flop 2 and hence a high signal appears at the negative output terminal $\overline{Q}$ of the JK flip-flop 2, as designated as the reference numeral c in FIG. 3. On the other hand, low signals are applied respectively to the D input terminal and clock terminal Clk of the D flip-flop 6, thereby allowing a signal from the positive output terminal Q of the D flip-flop 6 to be maintained low identically to that of the initial state, as indicated as the reference numeral d in FIG. 3. As a result, a low signal as shown as the reference numeral e in FIG. 3 appears at the output terminal of the AND gate 7 which ANDs the output signals of the flip-flops 2 and 6 as indicated as the reference numerals c and d in FIG. 3, and then is applied to the base of the transistor 8, thereby causing the transistor 8 to be turned off, resulting in the isolation of the power supply stage from the transmitting stage. For this reason, the power being supplied from the power supply stage is broken.

The talk condition means that the talk terminal 4 is turned on. Under this talk condition, the high signal from the talk terminal 4 as mentioned above and shown as the reference numeral b in FIG. 3 is applied directly to the input terminal D of the D flip-flop 6. Also, the high signal is delayed by the buffer 5 and then the delayed signal is applied to the clock terminal Clk of the D flip-flop 6. As a result, a high signal appears at the positive output terminal Q of the D flip-flop 6. On the other hand, the signal from the negative output terminal $\overline{Q}$ of the JK flip-flop 2 is maintained high. Hence, a high signal as shown as the reference numeral e in FIG. 3 appears at the output terminal of the AND gate 7 which ANDs the output signals of the flip-flops 2 and 6, and then is applied to the base of the transistor 8, thereby causing the transistor 8 to be turned on. For this reason, the power from the power supply stage is supplied to the transmitting stage.

The alarm tone detection condition means that the counterpart takes an on-hook state in the course of talk, or the talker dials the counterpart while the line of the counterpart is busy, or the talk terminal 4 is not turned off through talker's carelessness. Under this alarm tone detection condition, after the lapse of a predetermined period of time, the busy tone, the leave-alone tone and the alarm tone are sent from the communication network (the switch board of the exchange). The call processing tone detector 1 detects automatically those dual tones. Upon detecting the dual tones, the call processing tone detector 1 outputs a burst tone signal in the form of intermittence as indicated as the reference numeral a in FIG. 3 to the clock terminal Clk of the JK flip-flop 2. At the first rising edge of the clock, a low signal appears at the negative output terminal $\overline{Q}$ of the JK flip-flop 2 as the input state (high) of the J input terminal. The low signal from the negative output terminal $\overline{Q}$ of the JK flip-flop 2 is applied to the clear terminal C of the D flip-flop 6, thereby causing a low signal to appear at the positive output terminal Q of the D flip-flop 6. This low signal from the positive output terminal Q of the D flip-flop 6 is then applied to the clear terminal C of the JK flip-flop 2 and to the AND gate 7. As a result, a low signal appears at the output terminal of the AND gate 7 and then is applied to the base of the transistor 8, thereby causing the transistor 8 to be turned off, resulting in the isolation of the power supply stage from the transmitting stage. For this reason, the power being supplied from the power supply stage is broken. At the same time, the JK flip-flop 2 is cleared and thus a high signal appears at the negative output terminal $\overline{Q}$ of the JK flip-flop 2, while the input state of the clear terminal C of the D flip-flop 6 continues to be maintained high, enabling the output signal from the output terminal Q of the D flip-flop 6 to be maintained low, i.e., the cleared output state.

At the second rising edge of the clock, a low signal appears at the negative output terminal $\overline{Q}$ of the JK flip-flop 2. The low signal from the negative output terminal $\overline{Q}$ of the JK flip-flop 2 is applied to the clear terminal C of the D flip-flop 6, so that the D flip-flop 6 is cleared, thereby causing a low signal to appear at the positive output terminal Q of the D flip-flop 6. This low signal from the positive output terminal Q of the D flip-flop 6 is then applied to the clear terminal C of the JK flip-flop 2, so that the JK flip-flop 2 is cleared, thereby causing a high signal to appear at the negative output terminal $\overline{Q}$ of the JK flip-flop 2. As a result, similarly, a low signal appears at the output terminal of the AND gate 7, so that the power being supplied from the power supply stage is broken. This situation continues until the talk terminal 4 is reset by the user.

Figure 2:
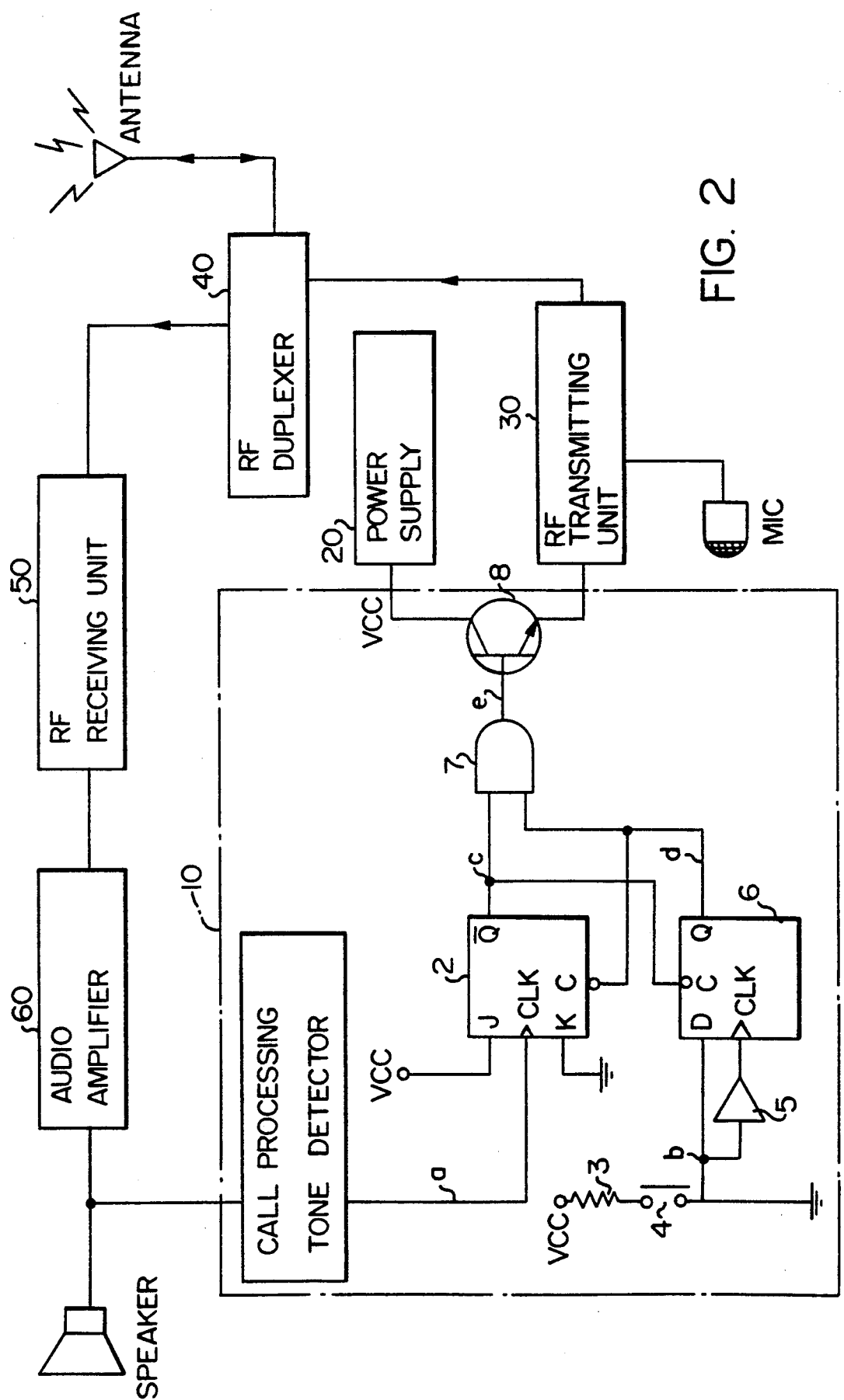
FIG. 2 is a schematic diagram of a portable communication equipment utilizing the circuit in FIG. 1.

With reference to FIG. 2, there is shown a schematic diagram of a personal, portable communication equipment utilizing the automatic power breaking circuit of the present invention in accordance with the preferred embodiment of the present invention. In this drawing, the reference numeral 10 designates the automatic power breaking circuit of the present invention, 20 a power supply, 30 a radio frequency (RF) transmitting unit, 40 a RF duplexer, 50 a RF receiving unit, and 60 an audio amplifier, respectively.

The call processing tone detector 1 in the automatic power breaking circuit 10 is connected to the rear of an audio amplifier 60 in the receiving stage, so as to detect automatically call processing signals (dual tones such as the busy tone, the leave-alone tone, the alarm tone and etc.) sent from the communication network (cellular network). The transistor 8 is connected between a power supply 20 and a RF transmitting unit 30, so as to break automatically the power being supplied from the power supply 20 to the RF transmitting unit 30 at conditions of communication discontinuance or communication incapability. In supplying the source voltage Vcc respectively to the transmitter and receiver, the power supply 20 supplies the source voltage Vcc through individual source voltage terminals.

Referring again to FIG. 3, the reference numeral a designates an output waveform from the call processing tone detector 1, b an output waveform from the talk terminal 4, c an output waveform from the JK flip-flop 2, d an output waveform from the D flip-flop 6, and e an output waveform from the AND gate 7, respectively. The reference numeral f illustrates the generation of the alarm tone in the case where the line of the counterpart is busy or the counterpart takes an on-hook state in the course of talk.

Typically, the handset power of the personal, portable communication equipment (a handset of a cordless phone, a portable telephone and the like) is always ON in the standby mode. Hence, in call incoming, upon generation of the ring tone the user switches the talk terminal 4 to the ON state for establishment of talk. In call originating, the user switches the talk terminal 4 to the ON state and then dials the counterpart for establishment of talk. Also, in the portable communication equipment, the radio frequency (RF) section consists of a transmitter and a receiver. In reception, the consumption of the power is small in quantity because of the operation of only receiver, while, in transmission, the consumption of the power is large in quantity at the amplifier of the RF stage. Therefore, with the automatic power breaking circuit of the present invention, an unnecessary loss of the electric power in the portable communication equipment can be prevented by breaking the power being supplied from the power supply stage to the transmitting stage at conditions of communication discontinuance or communication incapability.

As hereinbefore described, in accordance with the present invention, an unnecessary loss of the electric power in the portable communication equipment can be prevented, so that the life span of the charging battery contained therein and the portable communication period of time can be lengthened, and the power supply can be miniaturized.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. An automatic power breaking circuit for a communication equipment, for breaking automatically electric power in the communication equipment when the communication equipment does not perform transmission and reception for talk, comprising:

call processing tone detecting means connected to a receiving stage of the communication equipment, for detecting a plurality of predetermined tones provided from a switch board of an exchange;

first flip-flop means connected to said call processing tone detecting means, for receiving a source voltage;

talk terminal means for receiving said source voltage nd being manually switched to an ON state by the user when transmission or reception is required;

second flip-flop means connected to said talk terminal means;

ANDing means connected to output terminals of said first and second flip-flop means; and switching means connected to an output terminal of said ANDing means, for switching power being supplied to a transmitting stage of the communication equipment;

whereby the power can automatically be broken by detecting said plurality of predetermined tones.

2. An automatic power breaking circuit for a communication equipment, as set forth in claim 1, wherein said plurality of predetermined tones are a busy tone, a leave-alone tone and an alarm tone provided from the switch board of the exchange, and said processing tone detecting means is a dual tone detecting device for detecting said busy tone, leave-alone tone and alarm tone to output a burst tone.

3. An automatic power breaking circuit for a communication equipment, as set forth in claim 1, wherein said first flip-flop means is a JK flip-flop including its J input terminal for receiving said source voltage, its clock input terminal connected to said call processing tone detecting means, its K input terminal connected to ground and its clear terminal connected to said output terminal of said second flip-flop means.

4. An automatic power breaking circuit for a communication equipment, as set forth in claim 1, further comprising:

buffering means connected between said talk terminal means and said second flip-flop means, for delaying an output signal from said talk terminal means and applying the delayed signal to said second flip-flop means.

5. An automatic power breaking circuit for a communication equipment, as set forth in claim 4, wherein said second flip-flop means is a D flip-flop including its D input terminal connected to said talk terminal means, its clock input terminal connected to said buffering means, its clear terminal connected to said output terminal of said first flip-flop means.

6. An automatic power breaking circuit for a communication equipment, as set forth in claim 3 or 5, wherein said ANDing means is a two-input AND gate for ANDing a negative output signal from said JK flip-flop and a positive output signal from said D flip-flop.

7. An automatic power breaking circuit for a communication equipment, as set forth in claim 6, wherein said switching means is a npn transistor including its base connected to said output terminal of said ANDing means, its collector connected to a power supply stage of the communication equipment, and its emitter connected to said transmitting stage of the communication equipment.

8. An automatic power breaking circuit for a communication equipment, as set forth in claim 7, wherein the power from said power supply stage of the communication equipment is supplied respectively to said transmitting and receiving stages through individual terminals, and said switching means operates to switch only power being supplied to said transmitting stage.

9. An automatic power breaking circuit for a communication equipment, as set forth in claim 1, wherein said talk terminal means includes a toggle switch.

* * * * *